Dec. 8, 1970   B. MAXWELL   3,545,041
APPARATUS FOR MIXING DEVOLATIZING AND EXTRUDING
Filed Jan. 10, 1968   4 Sheets-Sheet 1

INVENTOR.
BRYCE MAXWELL
BY Nolte + Nolte
ATTORNEYS

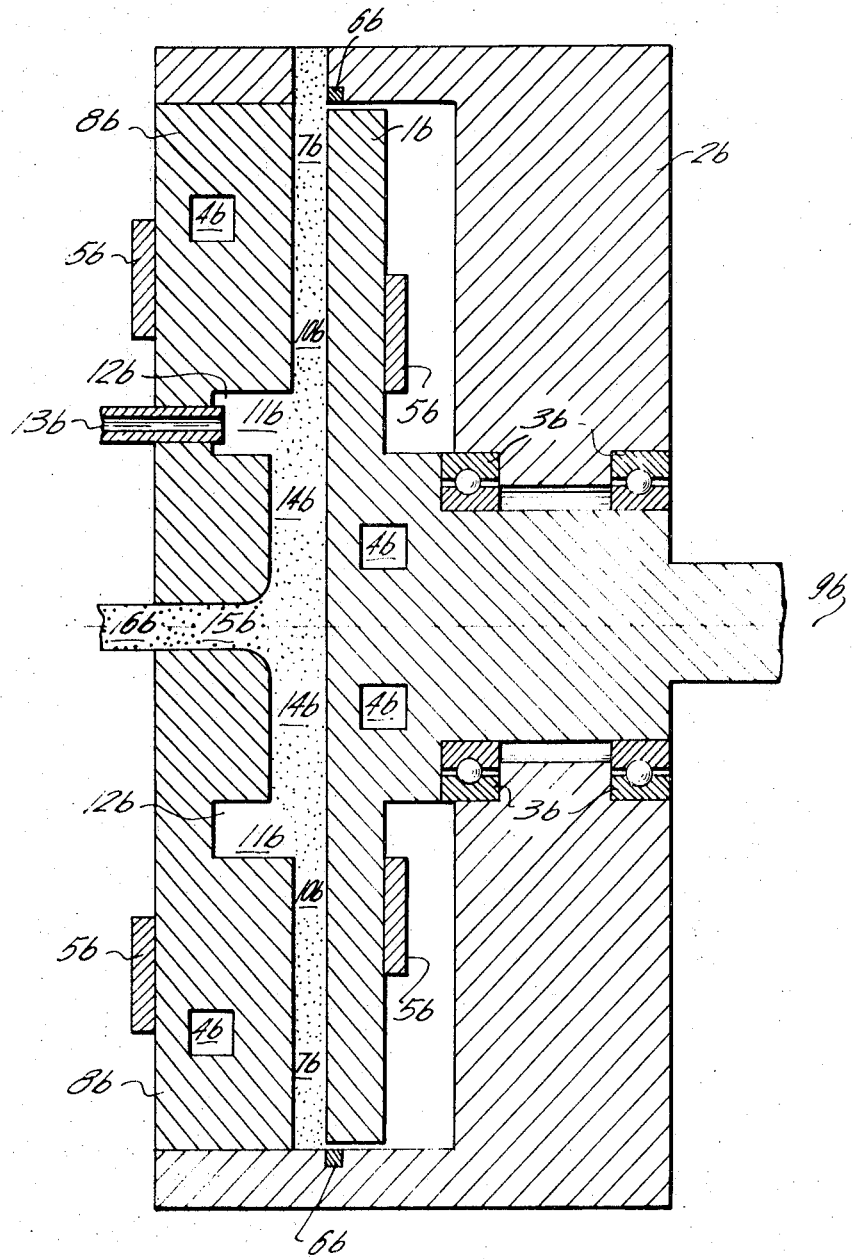

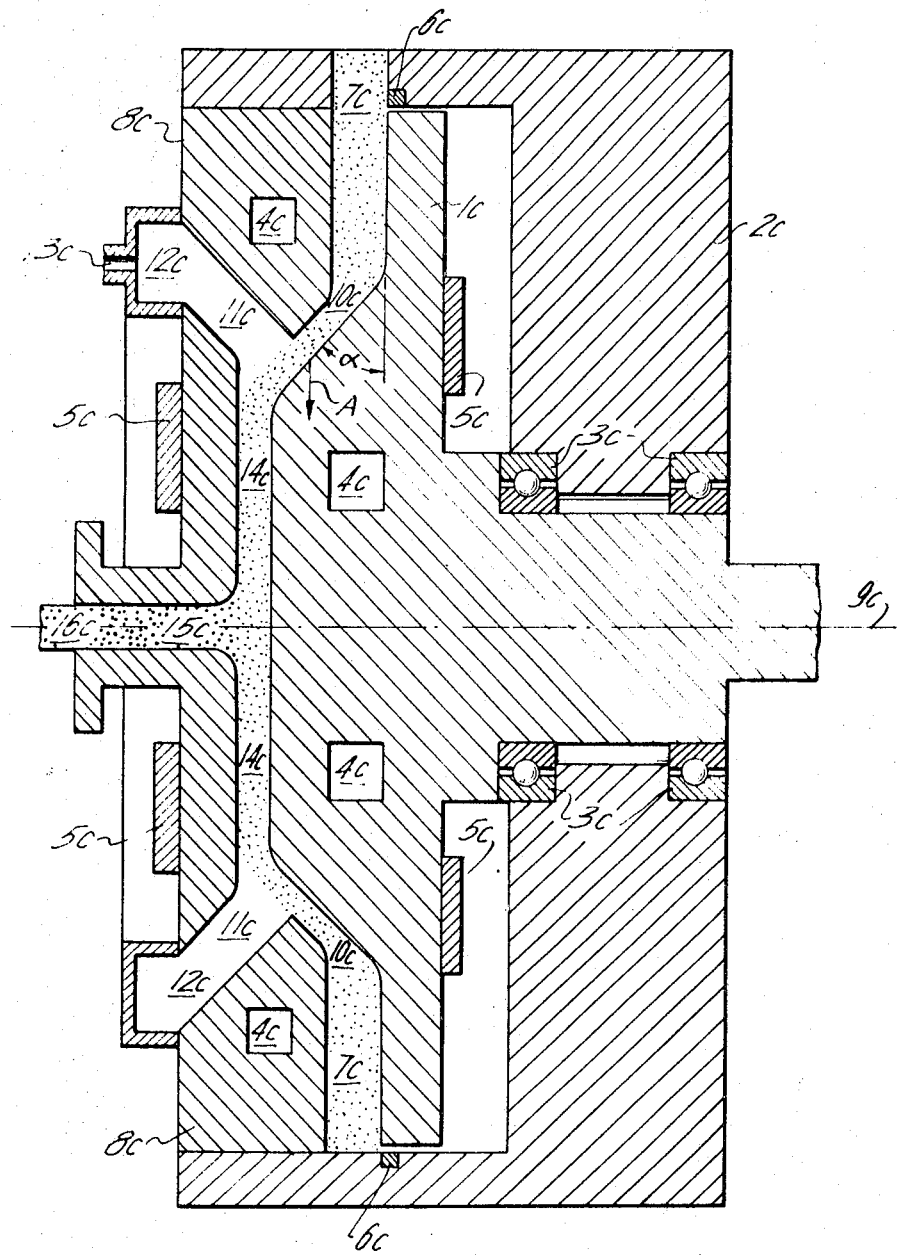

United States Patent Office 3,545,041
Patented Dec. 8, 1970

3,545,041
APPARATUS FOR MIXING DEVOLATIZING
AND EXTRUDING
Bryce Maxwell, 19 McCosh Circle,
Princeton, N.J. 08540
Filed Jan. 10, 1968, Ser. No. 696,792
Int. Cl. B29f 3/02
U.S. Cl. 18—12                                    7 Claims

ABSTRACT OF THE DISCLOSURE

Ports or vents are formed through the stationary or rotary member of an elastic melt extruder for removing volatile material from the melt being extruded and for supplying additives to the melt. The surfaces between the members are surfaces of revolution and are contoured to provide an increasing space between them as the radius of the surface of revolution decreases.

DISCLOSURE OF THE INVENTION

The present invention relates to the mixing, extruding and removal of volatile material from visco-elastic materials of the nature of plastics, high polymers, bread doughs, etc. More particularly the invention relates to a method and apparatus for accomplishing mixing, extruding and removal of volatile materials (devolatilizing).

In accordance with the present invention, the material is sheared between a stationary plate and a rotating plate either or both of which contain openings or ports through which the volatile components of the feed material can be removed.

There has recently been developed a new type of mixing extruder commonly known as the "elastic melt extruder." Such an extruder is described in "Modern Plastics Magazine" of October 1959 in an article by Bryce Maxwell and Anthony J. Scalora and in U.S. Pat. No. 3,046,603 issued to Bryce Maxwell July 31, 1962. Elastic melt extrusion includes mixing, compounding and transporting of materials, as well as changing the condition or state of materials by the addition of heat and pressure. Extrusion is accomplished by utilization of the centripetal pumping effect which results when a visco-elastic material is sheared between a stationary surface and a rotating surface or disc.

The present invention in its broadest aspect provides a useful method of removing volatile materials from the visco-elastic material being mixed and extruded in an elastic melt extruder. In accordance with another aspect of this invention, a method and apparatus are provided for the controlled introduction or addition of materials to the visco-elastic material being extruded at a point in the extrusion process where the visco-elastic material has already been subjected to some mixing and heat plasticizing, but prior to final mixing and extrusion.

The present invention has utility in many processing fields such as, for example, the processing of high polymeric materials. In the processing of high polymeric materials, raw polymer containing undesirable materials of low molecular weight such as monomer, solvents, water, etc., must be subjected to treatments in order to remove the undesirable low molecular weight material, to mix with the polymer additives such as other polymers, lubricants, fillers, plasticizers, stabilizers etc., and to compound and compact the resulting formulation into useful physical form. The present invention provides a method for accomplishing these processing operations simultaneously in one operation in an extrusion apparatus which is simple in design, rugged in construction and economical to manufacture.

The present invention is based on the discovery that under proper conditions it is possible to expose a portion of the visco-elastic material being sheared in an elastic melt extruder to a port, hole or vent or to ports, holes or vents to remove the volatile materials or to a port, hole or vent or to ports, holes or vents through which additives such as fillers, etc., may be introduced into the visco-elastic material being extruded. The invention is based on the analysis and discovery that, due to the elastic energy stored in the visco-elastic material being sheared between the stationary and rotating plates of an elastic melt extruder, visco-elastic material which passes an opening, hole, vent or port in either the stationary or rotating plate will be pumped centripetally in toward the axis of rotation and that such material will continue to be centripetally pumped, rather than be pushed out the opening, hole, vent or port. This discovery, therefore, may be applied in a useful manner by providing openings, vents, holes or ports through which volatiles may be removed or additives introduced to the visco-elastic material being extruded.

The discovery embodied in the present invention is completely new and novel and, therefore, is not immediately apparent. The centripetal pumping action of elastic melt extruders arises from the "normal force effect." The term "normal force effect" denotes forces perpendicular to the direction of shear in a flowing material and has been the subject of intensive analytical study. The current state of knowledge as displayed in the literature indicates that the entire area of a plate rotationally shearing a liquid will be subjected to a "normal force" or pressure perpendicular to the plate. See, for example, Weissenberg, K., "Nature," v. 159, pages 310–311, March 1947, and Hull, H. H., "Transactions of the Society of Rheology," vol. V, page 118, FIG. 1, 1961. Such a "normal force" would be expected to cause flow of the liquid being sheared into any opening or hole in the plate. The present invention is based on the discovery that this is not the case when the material being rotationally sheared is also flowing centripetally toward the center of rotation, as is the case in the elastic melt extruders described herein. As long as centripetal flow takes place the material being rotationally sheared will not flow into openings or holes in the rotating plate.

The theory behind the invention is that shearing in an elastic melt extruder produces a storage of elastic energy in tension around circular paths. Thus, in the embodiment of FIG. 4, the polymer melt surrounding the protrusion may be thought of as a bunch of rubber bands wrapped around the protrusion. This elastic tensile energy stored in the wrapped-around rubber bands forces said rubber bands or polymer melt against the protrusion, so that they slide along the protrusion and toward the center or axis of rotation rather than filling up the hole, vent, opening or port. If there were no flow toward the exit die, new material, coming in, would fill up the vent. The point is, however, that in this shear field, if the material is permitted to flow out the die exit, it is possible to open up holes, openings, vents, ports, or the like, in the stationary plate without such holes or the like being filled with polymeric material.

Another object of the invention is to provide an improved elastic melt extruder in which the stationary and rotating members are properly contoured to compact, heat, plasticize, mix and extrude the visco-elastic material in a new and more efficient manner. When certain visco-elastic materials are extruded in an elastic melt extruder, difficulties have been encountered when said visco-elastic materials form balls or pinwheel spokes in the feed zone at the periphery of the shearing area. This causes a decrease in the efficiency of mixing and extrusion. This difficulty has been recognized by J. E. Henry in U.S. Patent No. 3,303,253, L. D. Ninneman in U.S. Patent No. 3,280,239, V. I. Morozov et al. in U.S. Patent No. 3,310,835, L. C. Bearer et al. in U.S. Patent No. 3,308,505, I. N. Nikiforov in U.S. Patent No. 3,277,528, and T. T. Bunch in U.S. Patent No. 3,082,476. The present invention provides a method for correction of this feed zone difficulty, based on my discovery that if the stationary and rotating members or plates are contoured in such a manner that the axial thickness or gap between the stationary and rotating plates increases as the distance from the axis of rotation decreases, the balls or pinwheel spokes of the visco-elastic material move rapidly away from the peripheral feed zone and inwardly toward the axis of rotation to form a compacted mass in the shear zone.

Other objects, advantages and features of this invention will appear from the following description, when read in conjunction with the appended drawings, in which:

FIG. 3 is a transverse section of another embodiment of the extrusion apparatus of the present invention; and FIG. 4 is a transverse section of still another embodiment of the extrusion apparatus of the present invention.

Figure 2:
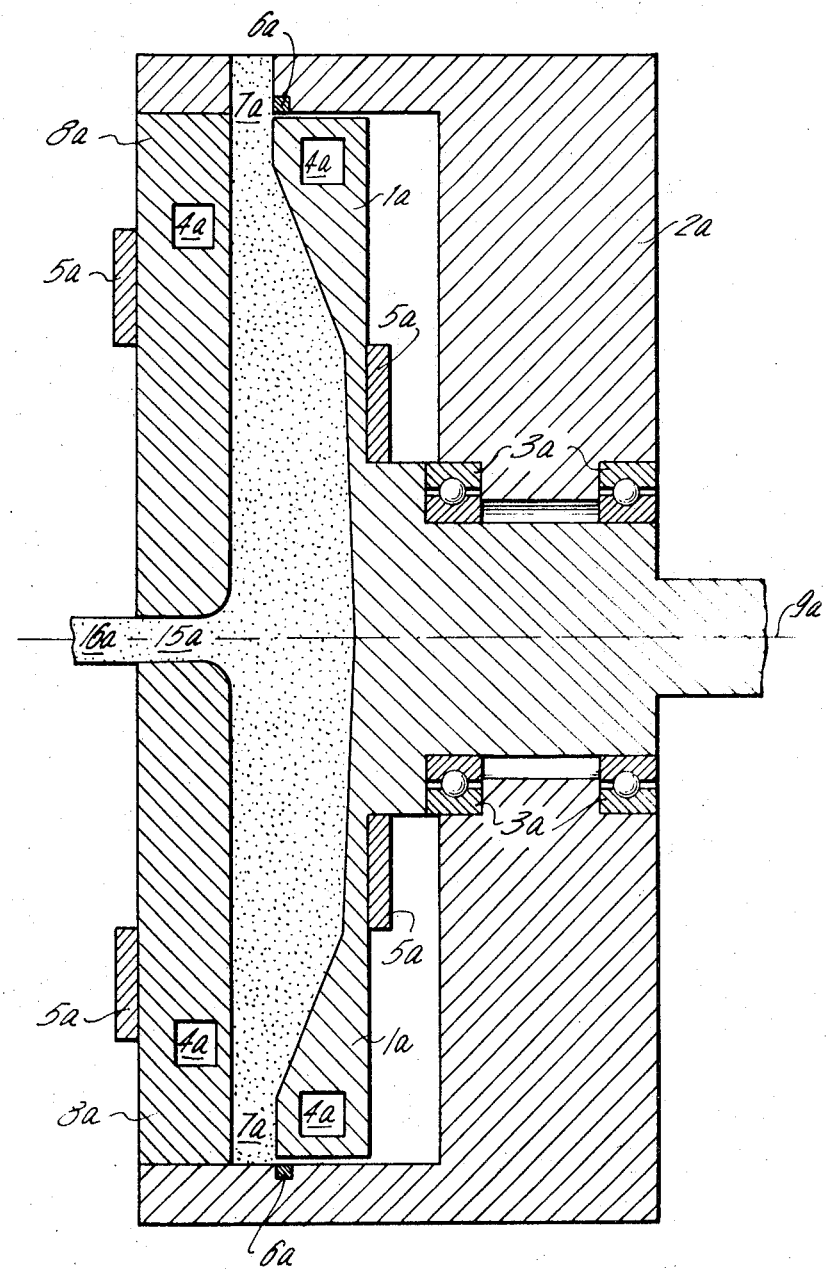
FIG. 2 is a transverse section of another embodiment of the extrusion apparatus of the present invention.

In the figures, the same components are identified by the same reference numerals with an additional letter suffix for each of the embodiments of FIGS. 2, 3 and 4.

The figures are not drawn to exact scale.

Figure 1:
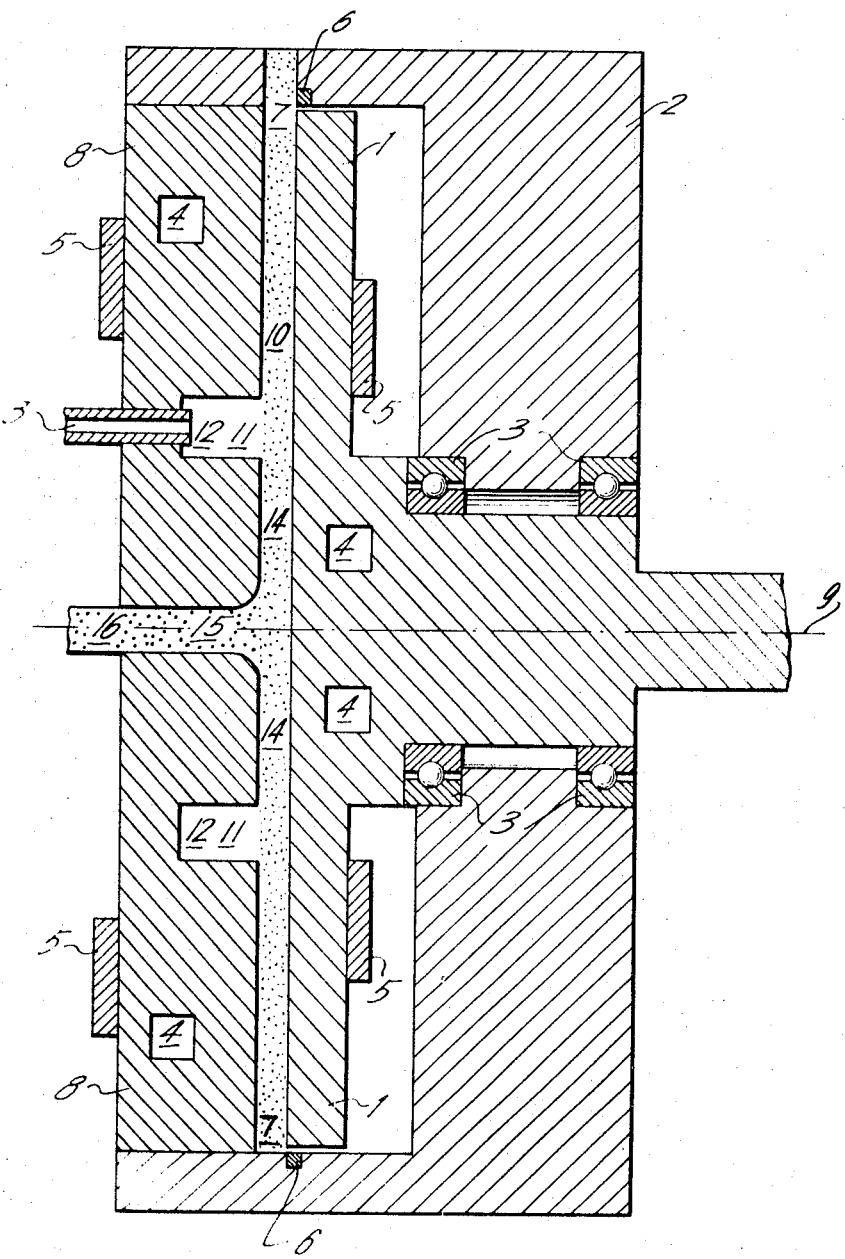
FIG. 1 is a transverse section of an embodiment of the extrusion apparatus of the present invention.

Referring to the drawings in particular, the invention as embodied in FIG. 1 includes the conventional parts of an elastic melt extruder. A rotating member or plate or rotor 1 is rotatably mounted in a frame 2 by means of bearings 3. The rotating plate 1 is rotated about an axis 9 by any conventional power drive and is heated or cooled by means of heaters 5 or cooling channels 4. A pressure seal 6 of annular configuration is provided in the frame 2 adjacent the rotor 1. A stationary member or plate or stator 8 is mounted in close proximity and essentially parallel to the face of the rotor 1 thereby providing a shearing zone or gap 7, 10, 14. The visco-elastic material to be heat, plasticized, mixed, devolatized, compounded and extruded is fed to the periphery of the gap 7 between the rotor 1 and the stator 8 by any suitable method used to feed elastic melt extruders.

The shearing action between the rotor and the stator causes storage of elastic energy in circular rings or paths in the visco-elastic material. In order to relieve this stored energy, the visco-elastic material flows in a radial direction through the gap 7, 10, 14 and out the die 15 to form the extrudate 16.

The above description describes conventional elastic melt extruders. The present invention is based on my discovery that if openings, vents, holes or ports 11 are built into the stator at points radially inward from the periphery 7, but not so far inward as to be on the axis of rotation 9, the visco-elastic material does not flow into such openings, vents, holes or ports 11, but rather continues to flow radially inward toward the die 15 due to the elastic energy stored. This permits the openings, vents, holes or ports 11 to be used as paths through which volatile materials may be removed. For increased efficiency of devolatizing, a vacuum may be applied through an outlet tube 13 to a manifold 12.

FIG. 2 discloses another embodiment of the invention. The rotor 1a, the stator 8a and the other essential parts of the elastic melt extruder are the same as the corresponding components of FIG. 1. The surface of the rotor 1a or the stator 8a is contoured in a manner such that the distance between the surface of said rotor and said stator increases as the distance from the axis of rotation 9a decreases. This contour of the rotor 1a or the stator 8a causes a wedging action on the visco-elastic material, to enhance compaction of the visco-elastic material, thereby to reduce or eliminate the formation of rolling balls or pinwheel spokes in the visco-elastic material being extruded.

FIG. 3 illustrates another embodiment of the invention. The rotor 1b, the stator 8b, and the other essential parts of the elastic melt extruder are the same as the corresponding components of FIG. 1. As the visco-elastic material moves from the periphery 7b toward the axis of rotation 9b it passes an opening or vent 11b and then enters a region in which the gap or thickness of the shearing zone is increased as at 14b. This increase in the thickness of the gap between the stator 8b and the rotor 1b provides additional space for the visco-elastic material to move into as it passes the vent 11b thereby reducing any tendency for said visco-elastic material to enter said vent. As a result, the volatile material in the visco-elastic material is permitted to enter the vent 11b and collects in the manifold 12b, which may be a circular or annular channel, as illustrated. The increase in the thickness of the gap in the shear zone 14b decreases any posibility the visco-elastic material being extruded will enter the vent 11b. After passing the vent 11b, the visco-elastic material enters the shear zone 14b of elastic melt centripetal pumping and said material is carried away from the devolatizing zone in the vent and into the die zone 15b to form the extrudate 16b.

FIG. 4 discloses still another embodiment of the invention. The rotor 1c, the stator 8c and the other essential parts of the elastic melt extruder are the same as the corresponding components of FIG. 1. As the visco-elastic material moves from the periphery 7c toward the axis of rotation 9c, it passes a protrusion on the rotor 1c in the region of the shear gap indicated by 10c. The visco-elastic material then passes a vent 11c and thence passes into another shear zone 14c of centripetal pumping. The visco-elastic material is pumped from the shear zone 14c by the elastic melt strangulation effect to the die region 15c to form the extrudate 16c. The embodiment of FIG. 4 of the invention is based upon the same principle as that of FIGS. 1 and 3, except that in the embodiment of FIG. 4, the angle $\alpha$, defining the protrusion on the rotor 1c, is greater than zero degrees and less than ninety degrees. The circumferentially stored elastic energy in the visco-elastic material produces a force, such as the vector A, radially inward against the protrusion on the rotor 1c, thereby holding said visco-elastic material against said rotor and thus decreasing any tendency of said visco-elastic material to enter the vent zone 11c.

The embodiments of the invention shown in FIGS. 1, 3 and 4 comprise apparatus for exposing the surface of the visco-elastic material, as it is being plasticized, mixed and homogenized, to the atmosphere or to a vacuum, thereby permitting the removal of volatile or gaseous low molecular weight materials such as $H_2O$ in cellulosic materials such as, for example, water absorbed on cellulose acetate, or solvents and emulsifying agents, used in polymerization operations. In order to remove these undesirable materials from the visco-elastic material being extruded, the surface of said visco-elastic material must be exposed to the atmosphere or to a vacuum after it has been compacted and brought to a temperature where the undesirable materials are above their boiling point, so that such undesirable material are gaseous. This is accomplished in the zones 7 and 10 of FIGS. 1, 3 and 4, and the volatile materials are removed in the regions 11 and 12, thereby accomplishing a new, useful and valuable process and result.

The present invention permits exposure of the surface of the visco-elastic material in an elastic melt extruder, making possible the addition by simple gravity flow or forced flow through ports, vents, holes or openings 11 of materials such as fillers, foaming agents, grafting agents, and other polymer additives or alloying elements, during the process of extrusion thereby accomplishing another new, useful and valuable operation and result.

While specific embodiments of the invention have been shown and described in detail to illustrate the application of the invention principles, it will be understood that the invention may be embodied otherwise without departure from such principles.

What is claimed is:

1. An elastic melt extruder comprising first and second members having first and second surfaces respectively spaced from and facing each other in close proximity, said surfaces being essentially surfaces of revolution, means for rotating one of said members to provide a relative rotation of said surfaces relative to their axis of revolution, means for feeding a visco-elastic material into the space between said surfaces in the peripheral region thereof, a discharge opening in one of said surface near said axis, said surfaces being contoured whereby said space between said surfaces has a portion which extends inwardly at an angle between 0° and 90° to said axis, vent means in the one of said surfaces at said portion which lies radially outwardly of the other of said surfaces, and heating means for heating said surfaces whereby said visco-elastic material becomes heated and mixed by the elastic melt extruder effect before being exposed to said vent.

2. The elastic melt extruder of claim 1 wherein said surfaces are contoured whereby said space has a further portion extending directly radially inwardly from said first mentioned portion toward said axis.

3. The elastic melt extruder of claim 1 wherein said surfaces are contoured whereby said space has a further portion extending directly radially outwardly from said first mentioned portion to said periphery.

4. The elastic melt extruder of claim 1 further comprising means for cooling said surfaces.

5. The elastic melt extruder of claim 1 in which said means for rotating comprises means for rotating said first member and said vent means is in said second member.

6. An elastic melt extruder, comprising a first member having a first surface essentially a surface of revolution; a second member having a second surface essentially a surface of revolution in closely spaced with and facing said first surface; said surfaces contoured to provide between them at their periphery an essentially radially inwardly extending portion of the space between said surfaces for centripetal pumping to an inwardly adjoining portion of the space between said surfaces which is at an angle with the axis of revolution and then to an inwardly adjoining portion of the space between said surfaces which extends essentially radially inward; means for rotating one of said members relative to the other about an axis subtsantially perpendicular to said surfaces; heating means for heating said surfaces; cooling means for cooling said surfaces; means for feeding visco-elastic material into the peripheral region of the space between said surfaces; a discharge opening formed through one of said members near the axis of rotation; and vent means located in that one of the said surfaces which forms the exterior of the space between said surfaces in the region of the angle between the two radially inward portions of the space between said surfaces, wherein said visco-elastic material is fed into the space between said surfaces in the peripheral area thereof and wherein said vent means is in close proximity with the portion of the space between said surfaces which is at an angle with the axis of revolution and said vent means opens from the last-mentioned portion of said space between said surface.

7. The elastic melt extruder of claim 6 wherein said vent means comprises an opening formed by surfaces of revolution about the axis of revolution.

References Cited

UNITED STATES PATENTS

| | | | |
|---|---|---|---|
| 3,079,635 | 3/1963 | Adams | 18—12X |
| 3,123,861 | 3/1964 | Westover | 18—12 |
| 3,277,528 | 10/1966 | Nikyorov | 18—12 |
| 3,308,505 | 3/1967 | Bearer et al. | 18—12 |
| 3,429,003 | 2/1969 | Herder et al. | 18—12 |

J. SPENCER OVERHOLSER, Primary Examiner